/ United States Patent (12)
Lu et al.

(10) Patent No.: US 7,418,177 B2
(45) Date of Patent: Aug. 26, 2008

(54) FIBER OPTIC CABLE BREAKOUT SYSTEM, PACKAGING ARRANGEMENT, AND METHOD OF INSTALLATION

(75) Inventors: Yu Lu, Westborough, MA (US); John Clifton Cobb, Fitchburg, MA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/490,644

(22) Filed: Jul. 21, 2006

(65) Prior Publication Data

US 2007/0104446 A1   May 10, 2007

Related U.S. Application Data

(60) Provisional application No. 60/751,316, filed on Dec. 16, 2005, provisional application No. 60/735,490, filed on Nov. 10, 2005.

(51) Int. Cl.
*G02B 6/44* (2006.01)
(52) U.S. Cl. .......................... 385/100; 385/135
(58) Field of Classification Search .............. None
See application file for complete search history.

(56) References Cited

U.S. PATENT DOCUMENTS

| | | |
|---|---|---|
| 2,047,152 A | 7/1936 | Mitchell |
| 3,691,505 A | 9/1972 | Graves |
| 3,845,552 A | 11/1974 | Waltz |
| 3,879,575 A | 4/1975 | Dobbin et al. |
| 3,912,854 A | 10/1975 | Thompson et al. |
| 3,912,855 A | 10/1975 | Thompson et al. |
| 4,085,286 A | 4/1978 | Horsma et al. |
| 4,107,451 A | 8/1978 | Smith, Jr. et al. |
| 4,152,539 A | 5/1979 | Charlebois et al. |
| 4,322,573 A | 3/1982 | Charlebois |
| 4,343,844 A | 8/1982 | Thayer et al. |
| 4,405,083 A | 9/1983 | Charlebois et al. |
| 4,413,881 A | 11/1983 | Kovats |
| 4,467,137 A | 8/1984 | Paget et al. |

(Continued)

FOREIGN PATENT DOCUMENTS

DE   35 37 684 A1   4/1987

(Continued)

OTHER PUBLICATIONS

"Cable Assemblies: Molding & Termination," http://www.dgo.com/prodcable.htm, 8 pages (Copyright 2001).

(Continued)

*Primary Examiner*—Kevin S Wood
*Assistant Examiner*—Mike Stahl
(74) *Attorney, Agent, or Firm*—Merchant & Gould P.C.

(57) ABSTRACT

Certain aspects of the disclosure relate to fiber optic cable systems, packaging configurations and methods that facilitate the effective use and installation of pre-terminated fiber optic cable. A fiber optic cable breakout arrangement can include a main cable, a branch cable that separates from the main cable, and an elongate protective sheath. Fibers of the branch cable can be packaged in the sheath to secure the fibers to the exterior of the main cable. In certain embodiments, the sheath can have a profile height extending generally radially outwardly from the main cable and a width that is greater than the profile height.

27 Claims, 13 Drawing Sheets

U.S. PATENT DOCUMENTS

| | | |
|---|---|---|
| 4,475,935 A | 10/1984 | Tanaka et al. |
| 4,481,380 A | 11/1984 | Wood et al. |
| 4,490,315 A | 12/1984 | Charlebois et al. |
| 4,512,628 A | 4/1985 | Anderton |
| 4,528,150 A | 7/1985 | Charlebois et al. |
| 4,528,419 A | 7/1985 | Charlebois et al. |
| 4,549,039 A | 10/1985 | Charlebois et al. |
| 4,550,220 A | 10/1985 | Kitchens |
| 4,556,281 A | 12/1985 | Anderton |
| 4,570,032 A | 2/1986 | Charlebois et al. |
| 4,581,480 A | 4/1986 | Charlebois |
| 4,589,939 A | 5/1986 | Mohebban et al. |
| 4,591,330 A | 5/1986 | Charlebois et al. |
| 4,592,721 A | 6/1986 | Charlebois et al. |
| 4,595,256 A | 6/1986 | Guazzo |
| 4,609,773 A | 9/1986 | Brown et al. |
| 4,625,073 A | 11/1986 | Breesch et al. |
| 4,629,597 A | 12/1986 | Charlebois et al. |
| 4,648,606 A | 3/1987 | Brown et al. |
| 4,648,919 A | 3/1987 | Diaz et al. |
| 4,654,474 A | 3/1987 | Charlebois et al. |
| 4,666,537 A | 5/1987 | Dienes |
| 4,670,069 A | 6/1987 | Debbaut et al. |
| 4,670,980 A | 6/1987 | Charlebois et al. |
| 4,678,866 A | 7/1987 | Charlebois |
| 4,684,764 A | 8/1987 | Luzzi et al. |
| 4,701,574 A | 10/1987 | Shimirak et al. |
| 4,725,035 A | 2/1988 | Charlebois et al. |
| 4,732,628 A | 3/1988 | Dienes |
| 4,747,020 A | 5/1988 | Brickley et al. |
| 4,761,052 A | 8/1988 | Buekers et al. |
| 4,764,232 A | 8/1988 | Hunter |
| 4,818,824 A | 4/1989 | Dixit et al. |
| 4,822,434 A | 4/1989 | Sawaki et al. |
| 4,875,952 A | 10/1989 | Mullin et al. |
| 4,884,863 A | 12/1989 | Throckmorton |
| 4,913,512 A | 4/1990 | Anderton |
| 4,961,623 A | 10/1990 | Midkiff et al. |
| 4,963,698 A | 10/1990 | Chang et al. |
| 5,004,315 A | 4/1991 | Miyazaki |
| 5,042,901 A | 8/1991 | Merriken et al. |
| 5,046,811 A | 9/1991 | Jung et al. |
| 5,054,868 A | 10/1991 | Hoban et al. |
| 5,066,095 A | 11/1991 | Dekeyser et al. |
| 5,074,808 A | 12/1991 | Beamenderfer et al. |
| 5,097,529 A | 3/1992 | Cobb et al. |
| 5,099,088 A | 3/1992 | Usami et al. |
| 5,115,105 A | 5/1992 | Gallusser et al. |
| 5,121,458 A | 6/1992 | Nilsson et al. |
| 5,125,060 A | 6/1992 | Edmundson |
| 5,185,844 A | 2/1993 | Bensel, III et al. |
| 5,194,692 A | 3/1993 | Gallusser et al. |
| 5,210,812 A | 5/1993 | Nilsson et al. |
| 5,217,808 A | 6/1993 | Cobb |
| 5,241,611 A | 8/1993 | Gould |
| 5,245,151 A | 9/1993 | Chamberlain et al. |
| 5,335,408 A | 8/1994 | Cobb |
| 5,347,089 A | 9/1994 | Barrat et al. |
| 5,353,367 A | 10/1994 | Czosnowski et al. |
| 5,376,196 A | 12/1994 | Grajewski et al. |
| 5,378,853 A | 1/1995 | Clouet et al. |
| 5,394,502 A | 2/1995 | Caron |
| 5,402,515 A | 3/1995 | Vidacovich et al. |
| 5,410,105 A | 4/1995 | Tahara et al. |
| RE34,955 E | 5/1995 | Anton et al. |
| 5,420,958 A | 5/1995 | Henson et al. |
| 5,440,665 A | 8/1995 | Ray et al. |
| 5,442,726 A | 8/1995 | Howard et al. |
| 5,450,517 A | 9/1995 | Essert |
| 5,491,766 A | 2/1996 | Huynh et al. |
| 5,509,202 A | 4/1996 | Abdow |
| 5,517,592 A | 5/1996 | Grajewski et al. |
| 5,528,718 A | 6/1996 | Ray et al. |
| 5,657,413 A | 8/1997 | Ray et al. |
| 5,666,453 A | 9/1997 | Dannenmann |
| 5,684,911 A | 11/1997 | Burgett |
| 5,696,864 A | 12/1997 | Smith et al. |
| 5,734,776 A | 3/1998 | Puetz |
| 5,767,448 A | 6/1998 | Dong |
| 5,778,122 A | 7/1998 | Giebel et al. |
| 5,823,646 A | 10/1998 | Arizpe et al. |
| 5,825,963 A | 10/1998 | Burgett |
| 5,892,870 A | 4/1999 | Fingler et al. |
| 5,945,633 A | 8/1999 | Ott et al. |
| 5,969,294 A | 10/1999 | Eberle et al. |
| 5,997,186 A | 12/1999 | Huynh et al. |
| RE36,592 E | 2/2000 | Giebel et al. |
| 6,104,846 A | 8/2000 | Hodgson et al. |
| RE37,028 E | 1/2001 | Cooke et al. |
| 6,181,861 B1 | 1/2001 | Wenski et al. |
| 6,215,930 B1 | 4/2001 | Estes et al. |
| 6,255,584 B1 | 7/2001 | Renaud |
| 6,376,774 B1 | 4/2002 | Oh et al. |
| 6,407,338 B1 | 6/2002 | Smith |
| 6,466,725 B2 | 10/2002 | Battey et al. |
| 6,493,500 B1 | 12/2002 | Oh et al. |
| 6,539,160 B2 | 3/2003 | Battey et al. |
| 6,579,014 B2 | 6/2003 | Melton et al. |
| 6,619,697 B2 | 9/2003 | Griffioen et al. |
| 6,621,975 B2 | 9/2003 | Laporte et al. |
| 6,648,520 B2 | 11/2003 | McDonald et al. |
| 6,655,016 B2 | 12/2003 | Renaud |
| 6,668,127 B1 | 12/2003 | Mahony |
| 6,706,968 B2 | 3/2004 | Yaworski et al. |
| 6,764,220 B2 | 7/2004 | Griffiths et al. |
| 6,810,194 B2 | 10/2004 | Griffiths et al. |
| 6,819,842 B1 | 11/2004 | Vogel et al. |
| 6,856,748 B1 | 2/2005 | Elkins, II et al. |
| 6,880,219 B2 | 4/2005 | Griffioen et al. |
| 7,006,739 B2 | 2/2006 | Elkins, II et al. |
| 7,016,592 B2 | 3/2006 | Elkins, II et al. |
| 7,228,036 B2 * | 6/2007 | Elkins et al. ............... 385/100 |
| 7,251,411 B1 * | 7/2007 | Lu et al. ..................... 385/147 |
| 2004/0074852 A1 | 4/2004 | Knudsen et al. |
| 2004/0228589 A1 | 11/2004 | Melton et al. |
| 2004/0247265 A1 | 12/2004 | Takano et al. |
| 2005/0053342 A1 | 3/2005 | Melton et al. |
| 2005/0069275 A1 | 3/2005 | Brants et al. |
| 2005/0111799 A1 | 5/2005 | Cooke et al. |
| 2005/0111800 A1 | 5/2005 | Cooke et al. |
| 2005/0129375 A1 | 6/2005 | Elkins, II et al. |
| 2005/0175308 A1 | 8/2005 | Elkins, II et al. |
| 2005/0259928 A1 | 11/2005 | Elkins, II et al. |
| 2005/0259929 A1 | 11/2005 | Elkins, II et al. |
| 2005/0259930 A1 | 11/2005 | Elkins, II et al. |
| 2005/0265672 A1 | 12/2005 | Theuerkorn et al. |
| 2005/0276552 A1 | 12/2005 | Cooke et al. |
| 2006/0056782 A1 | 3/2006 | Elkins, II et al. |
| 2006/0269209 A1 * | 11/2006 | Mullaney et al. ............ 385/135 |
| 2006/0291792 A1 | 12/2006 | Vo et al. |
| 2007/0196068 A1 * | 8/2007 | Mullaney et al. ............ 385/134 |

FOREIGN PATENT DOCUMENTS

| | | |
|---|---|---|
| EP | 0 115 725 A1 | 8/1984 |
| EP | 1 361 465 A1 | 11/2003 |
| JP | 58-105114 | 6/1983 |
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |
| JP | 62-54204 | 3/1987 |
| JP | 62-59906 | 3/1987 |

| | | |
|---|---|---|
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 2001-116968 | 4/2001 |
| WO | WO 2005/119322 A1 | 12/2005 |
| WO | WO 2006/044080 A1 | 4/2006 |

OTHER PUBLICATIONS

"DAM/BLOK™ Electrical Splice Kit," http://www.pmiind.com/products/damblok.html, 2 pages (Copyright 2000).

"Factory Installed Termination Systems for Fiber Optic Cable Splices," 1 page (admitted as prior art as of the filing date), date unknown.

"Installation Instructions for Pre-Connectorized MIC® Cable (2-6 Fiber) Equipped with Plug & Play™ Systems Pulling Grips," *Corning Cable Systems*, Issue 7, pp. 1-3 (Jul. 2001).

"Pre-Connectorized (4-24 Fiber) Fiber Optic Cables Equipped with Plug & Play™ Systems Pulling Sleeves and Grips," *Corning Cable Systems*, Issue 1, pp. 1-7 (Mar. 2005).

* cited by examiner

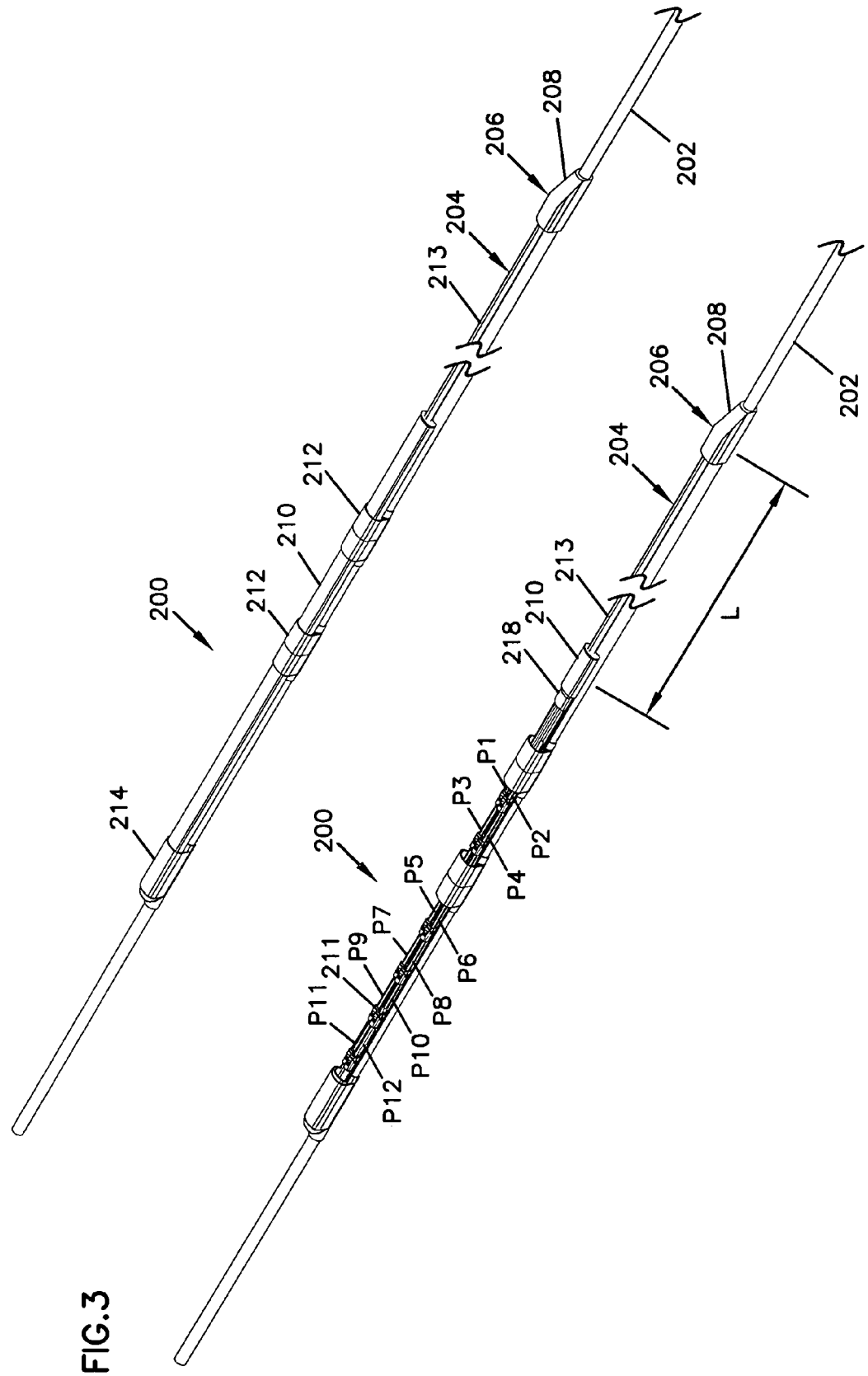

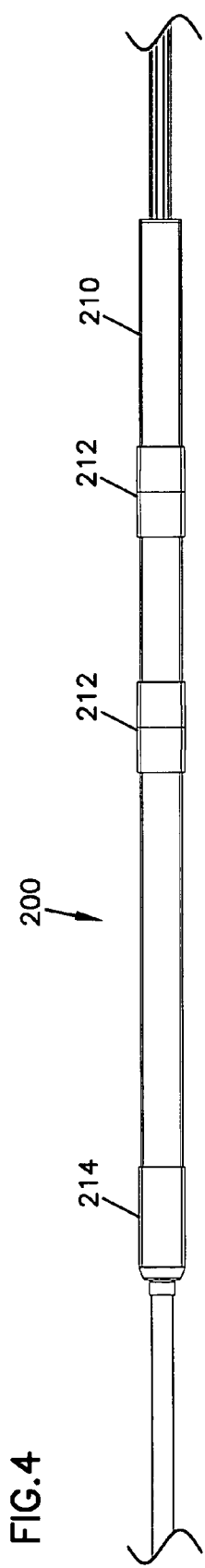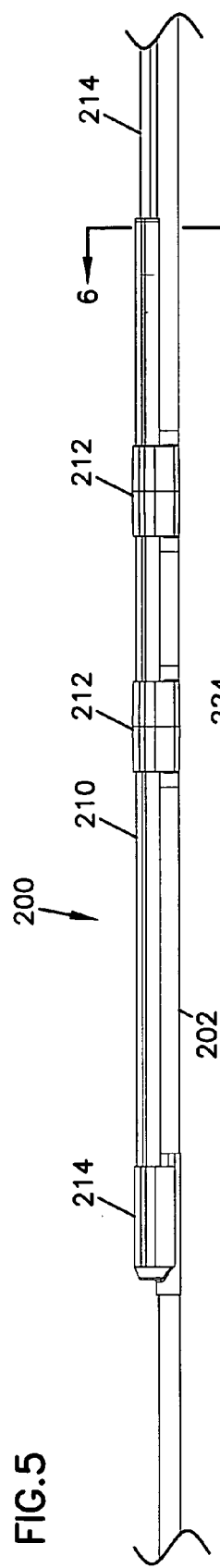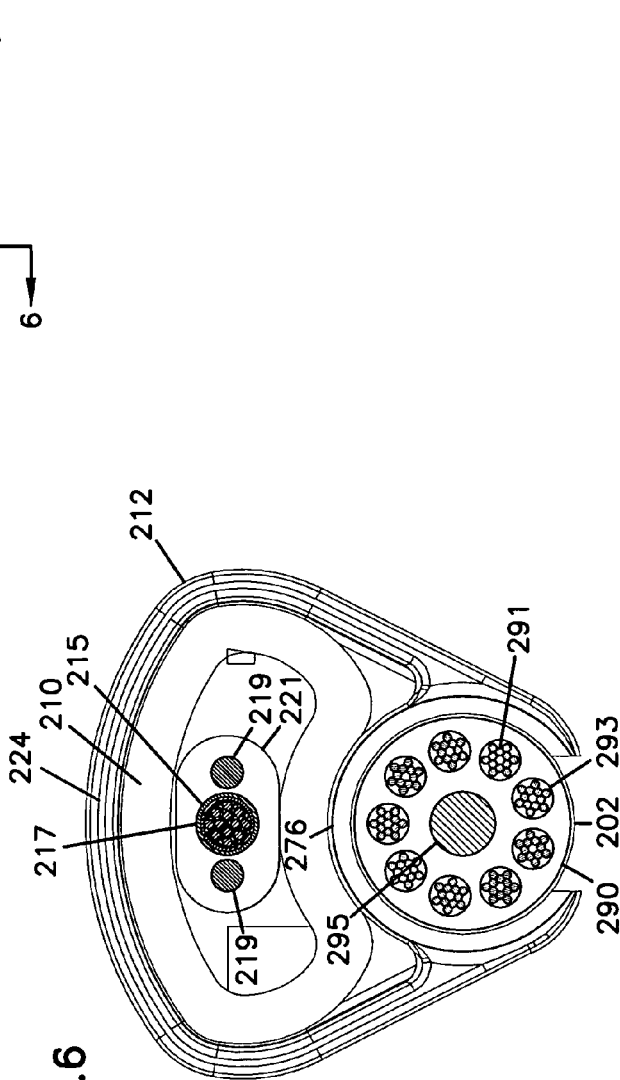

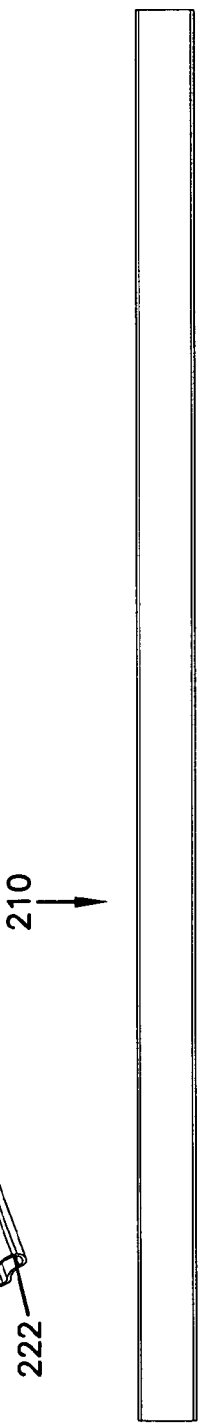
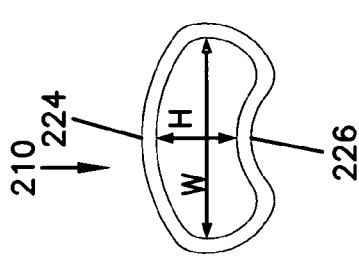
FIG. 7
FIG. 8
FIG. 9
FIG. 10

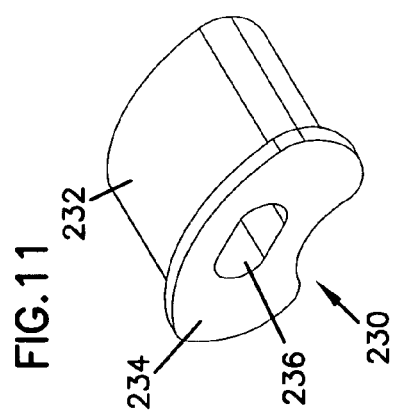
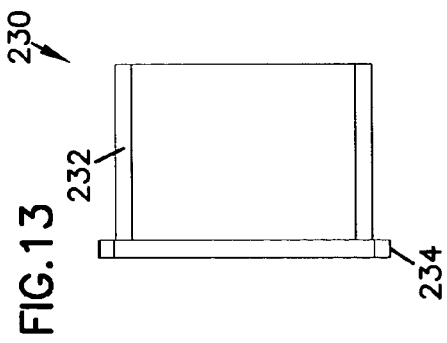
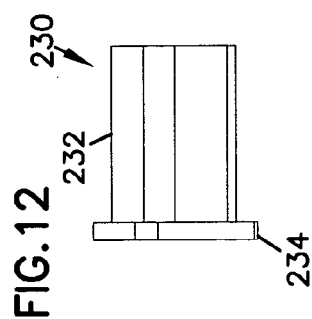
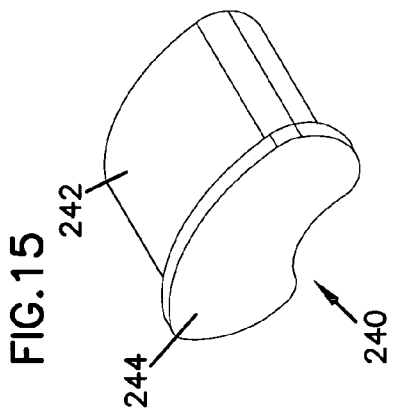
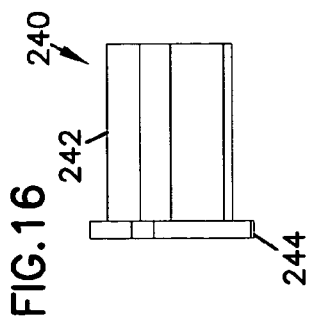
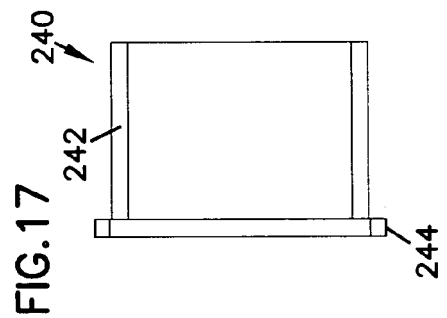
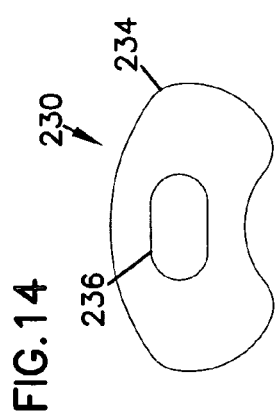
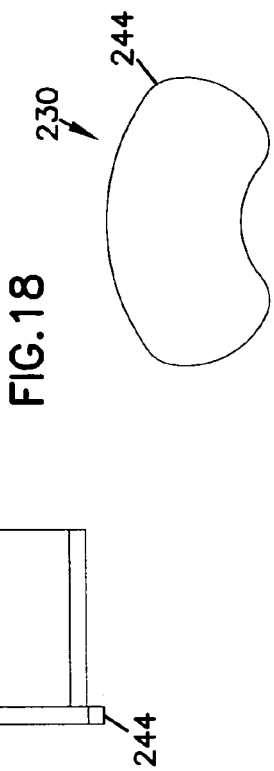

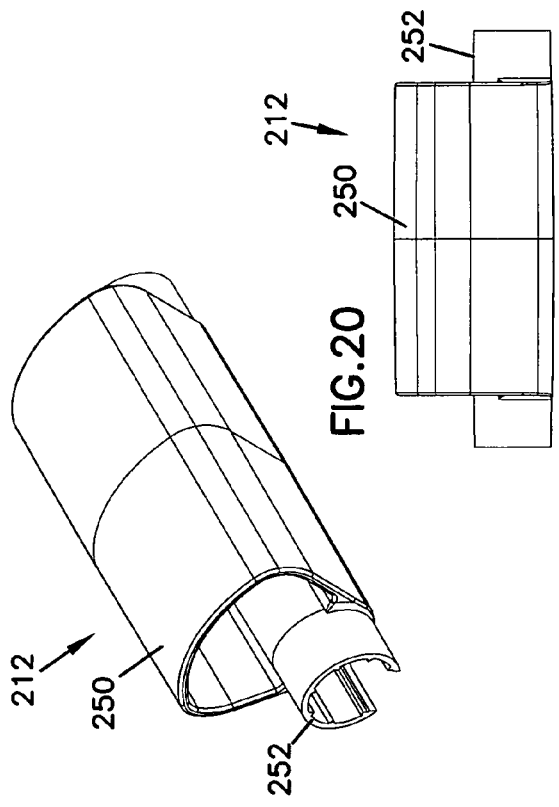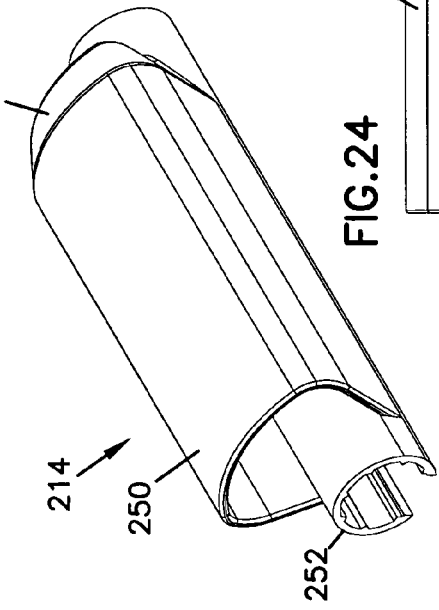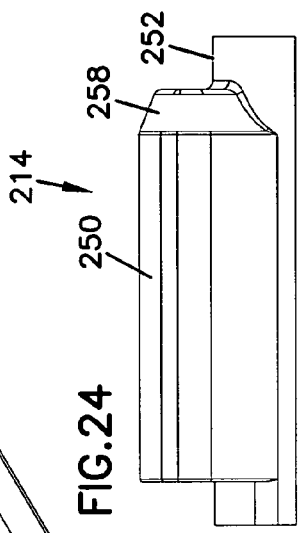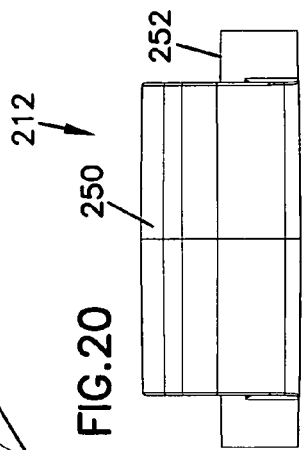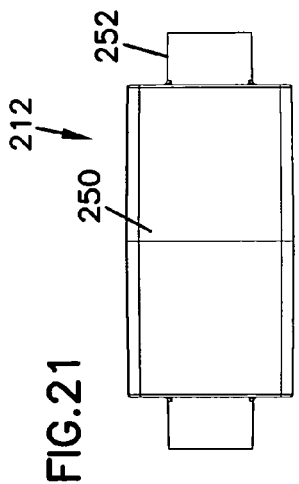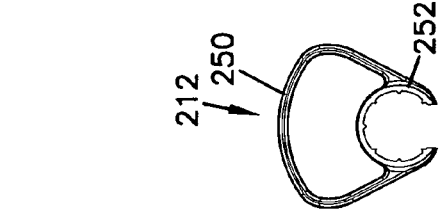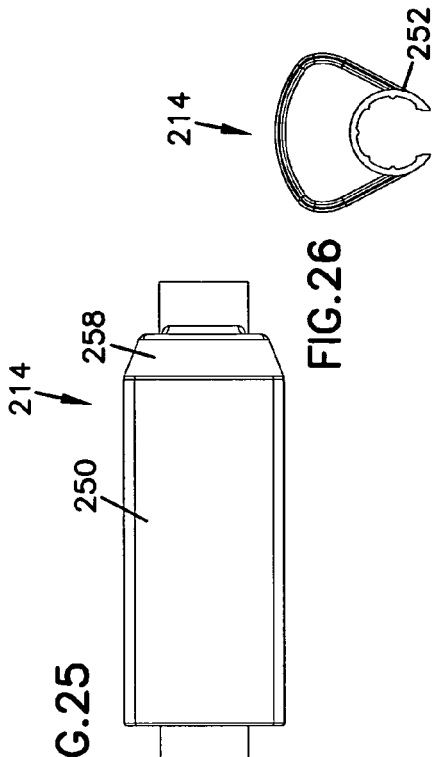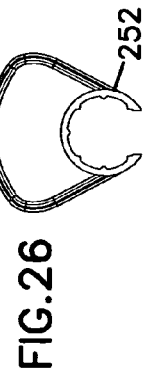

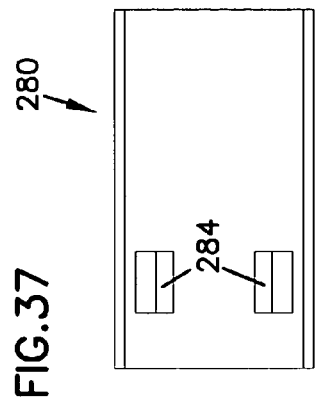
FIG.37
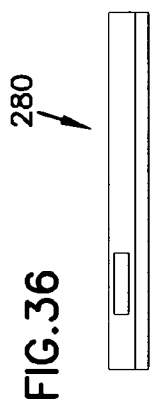
FIG.36
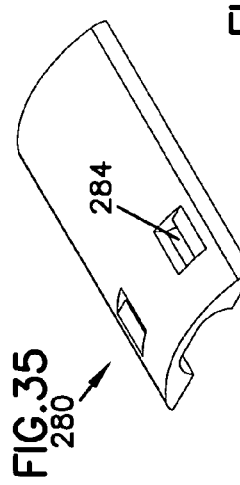
FIG.35
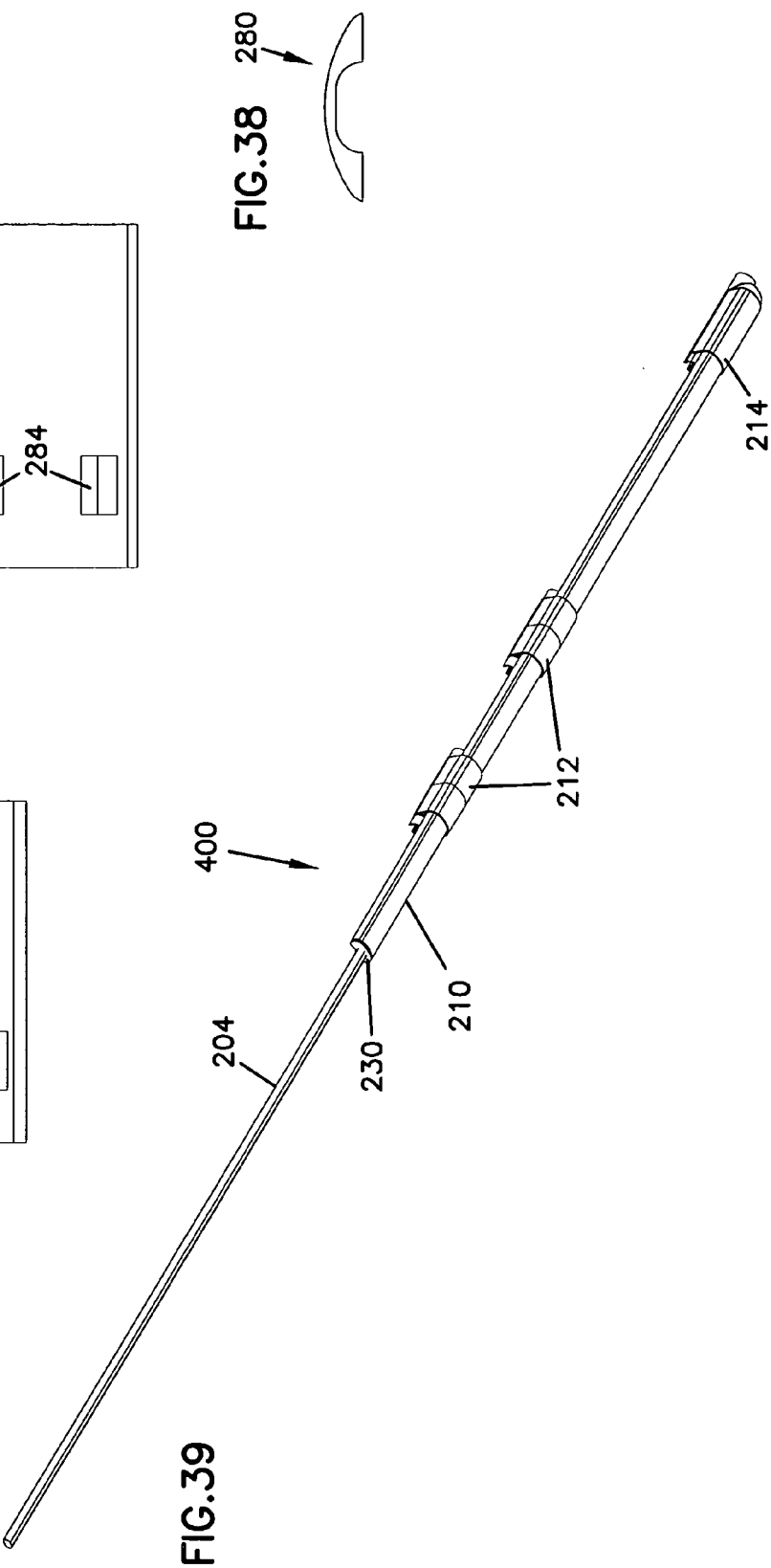
FIG.38
FIG.39

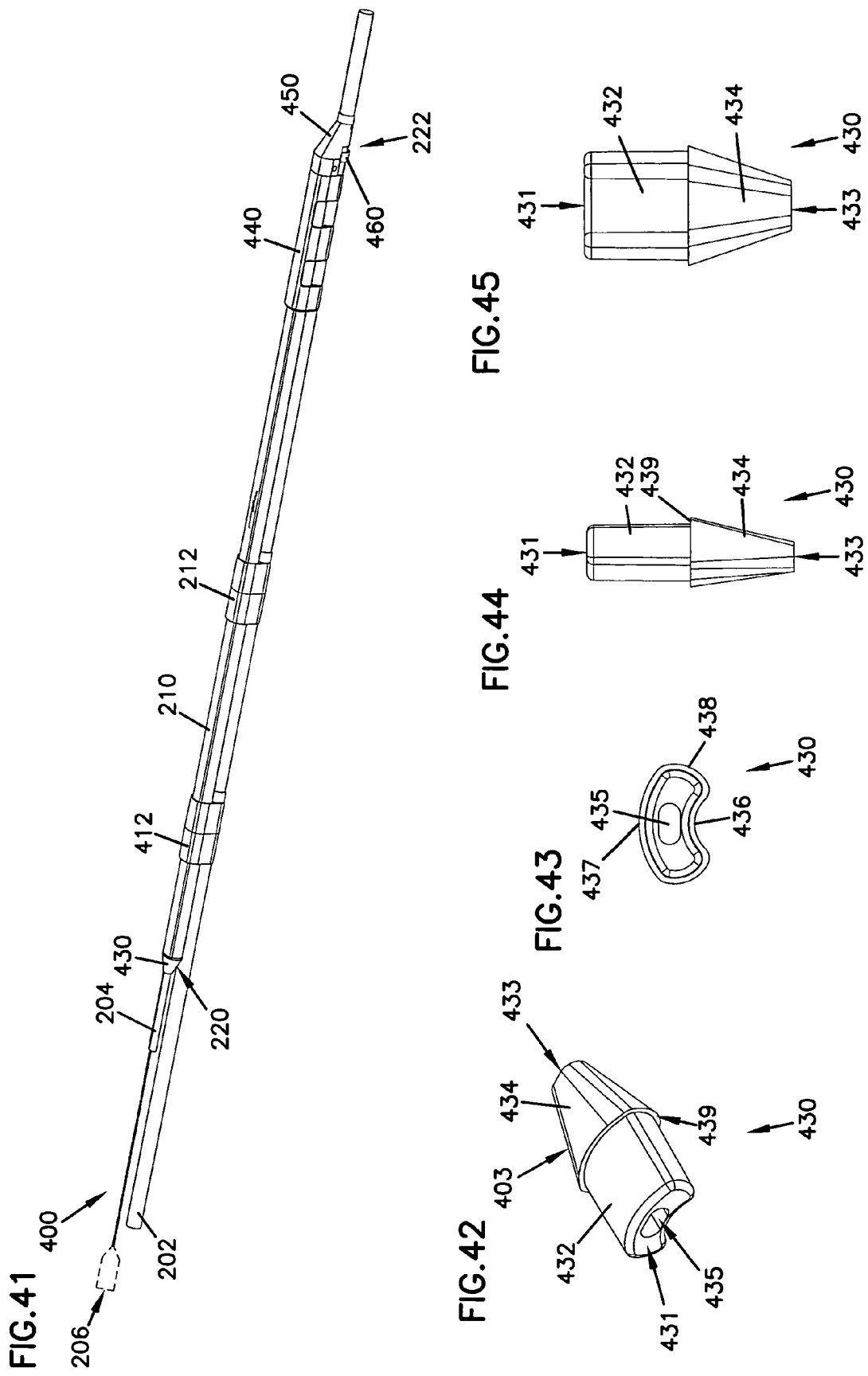

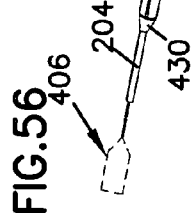
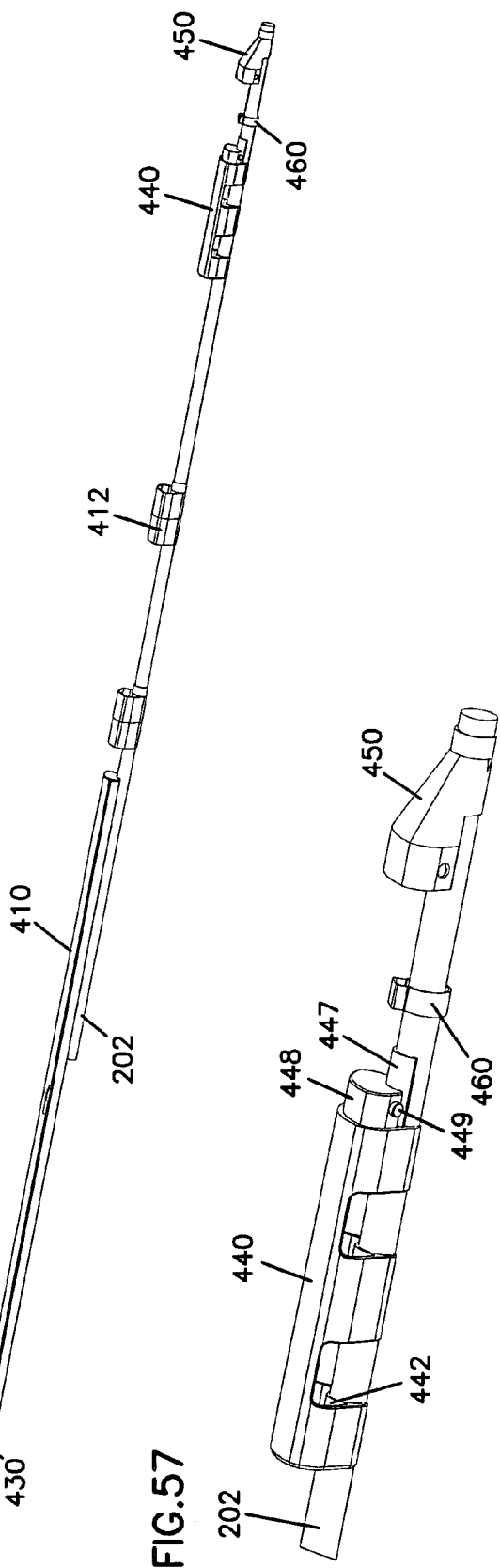
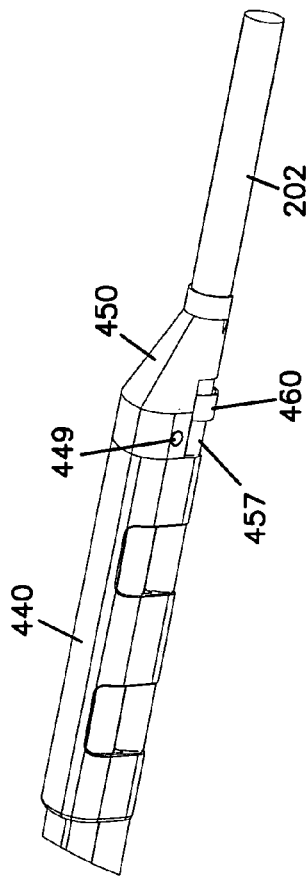

FIBER OPTIC CABLE BREAKOUT SYSTEM, PACKAGING ARRANGEMENT, AND METHOD OF INSTALLATION

RELATED APPLICATION

This application claims benefit of the provisional application having U.S. Ser. No. 60/735,490, entitled FIBER OPTIC CABLE BREAKOUT SYSTEM, PACKAGING ARRANGEMENT, AND METHOD OF INSTALLATION, filed Nov. 10, 2005, and to the provisional application having U.S. Ser. No. 60/751,316, entitled FIBER OPTIC CABLE BREAKOUT SYSTEM, PACKAGING ARRANGEMENT, AND METHOD OF INSTALLATION, filed Dec. 16, 2005, the disclosures of which are incorporated by reference.

TECHNICAL FIELD

The principles disclosed herein relate to fiber optic cable systems. More particularly, the present disclosure relates to fiber optic cable systems having main cables and branch cables.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown in FIG. 1, the network 100 may include a central office 110 that connects a number of end subscribers 115 (also called end users 115 herein) in a network. The central office 110 may additionally connect to a larger network such as the Internet (not shown) and a public switched telephone network (PSTN). The network 100 may also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits (e.g., see conduit 105).

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations may include fewer or more fibers. The portion of network 100 that includes an FDH 130 and a number of end users 115 may be referred to as an F2 portion of network 100. Splitters used in an FDH 130 may accept a feeder cable having a number of fibers and may split those incoming fibers into, for example, 216 to 432 individual distribution fibers that may be associated with a like number of end user locations.

Referring to FIG. 1, the network 100 includes a plurality of breakout locations 125 at which branch cables (e.g., drop cables, stub cables, etc.) are separated out from main cables (e.g., distribution cables). Breakout locations can also be referred to as tap locations or branch locations and branch cables can also be referred to as breakout cables. At a breakout location, fibers of the branch cables are typically spliced to selected fibers of the main cable. However, for certain applications, the interface between the fibers of the main cable and the fibers of the branch cables can be connectorized.

Stub cables are typically branch cables that are routed from breakout locations to intermediate access locations such as a pedestals, drop terminals or hubs. Intermediate access locations can provide connector interfaces located between breakout locations and subscriber locations. A drop cable is a cable that typically forms the last leg to a subscriber location. For example, drop cables are routed from intermediate access locations to subscriber locations. Drop cables can also be routed directly from breakout locations to subscriber locations hereby bypassing any intermediate access locations Branch cables can manually be separated out from a main cable in the field using field splices. Field splices are typically housed within sealed splice enclosures. Manual splicing in the field is time consuming and expensive.

As an alternative to manual splicing in the field, pre-terminated cable systems have been developed. Pre-terminated cable systems include factory integrated breakout locations manufactured at predetermined positions along the length of a main cable (e.g., see U.S. Pat. Nos. 4,961,623; 5,125,060; and 5,210,812). However, existing pre-terminated cable systems can be expensive because extra connectors at intermediate connection locations are often used. Moreover, the installation of pre-terminated cables can be difficult. For example, for underground applications, pre-terminations can complicate passing pre-terminated cable through the underground conduit typically used to hold fiber optic cable (e.g., 1.25 inch inner diameter conduit). Similarly, for aerial applications, pre-terminations can complicate passing pre-terminated cable through aerial cable retention loops.

SUMMARY

Certain aspects of the disclosure relate to fiber optic cable systems, packaging configurations and methods that facilitate the effective use and installation of pre-terminated fiber optic cable.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 2 is a perspective view of a cable system having features that are examples of inventive aspects in accordance with the principles of the present disclosure;

FIG. 3 show the cable system of FIG. 3 with a majority of the transport sheath cut away;

FIG. 4 is a top view of the cable system of FIG. 2;

FIG. 5 is a side view of the cable system of FIG. 2;

FIG. 6 is a cross-sectional view taken along section line 6-6 of FIG. 5;

FIG. 7 is a perspective view of the transport sheath of the cable system of FIG. 2;

FIG. 8 is a side view of the transport sheath of FIG. 7;

FIG. 9 is a top view of the transport sheath of FIG. 7;

FIG. 10 is an end view of the transport sheath of FIG. 7;

FIG. 11 is a perspective view on an end piece for sealing the second end of the transport sheath of FIG. 7;

FIG. 12 is a side view of the end piece of FIG. 11;

FIG. 13 is a top view of the end piece of FIG. 11;

FIG. 14 is an end view of the end piece of FIG. 11;

FIG. 15 is a perspective view on an end piece for sealing the first end of the transport sheath of FIG. 7;

FIG. 16 is a side view of the end piece of FIG. 15;

FIG. 17 is a top view of the end piece of FIG. 15;

FIG. 18 is an end view of the end piece of FIG. 15;

FIG. 19 is a perspective view of a first type of retaining clip used to secure the transport sheath of FIG. 7 to a main cable;

FIG. 20 is a side view of the retaining clip of FIG. 19;

FIG. 21 is a top view of the retaining clip of FIG. 19;

FIG. 22 is an end view of the retaining clip of FIG. 19;

FIG. 23 is a perspective view of a second type of retaining clip used to secure the transport sheath of FIG. 7 to a main cable;

FIG. 24 is a side view of the retaining clip of FIG. 23;

FIG. 25 is a top view of the retaining clip of FIG. 23;

FIG. 26 is an end view of the retaining clip of FIG. 23;

FIGS. 35-38 show various views of the lip of the fan-out block of FIG. 27;

FIG. 39 shows a breakout cable assembly having features that are examples of inventive aspects in accordance with the principles of the present disclosure;

FIG. 41 is a perspective view of an example mid-span breakout assembly;

FIG. 42 is a perspective view of an example first end piece of the breakout assembly of FIG. 41;

FIG. 43 is a cross-sectional view of the first end piece of FIG. 42;

FIG. 44 is a side view of the first end piece of FIG. 42;

FIG. 45 is a top view of the first end piece of FIG. 42;

FIG. 56 is a perspective view of the breakout assembly of FIG. 41 prior to installing the sheath in the retaining closure;

FIG. 57 is a magnified view of the retaining closure and second end piece of FIG. 56; and FIG. 58 is a magnified view of the retaining closure and second end piece of FIG. 41 after installation of the sheath.

DETAILED DESCRIPTION

Figure 1:
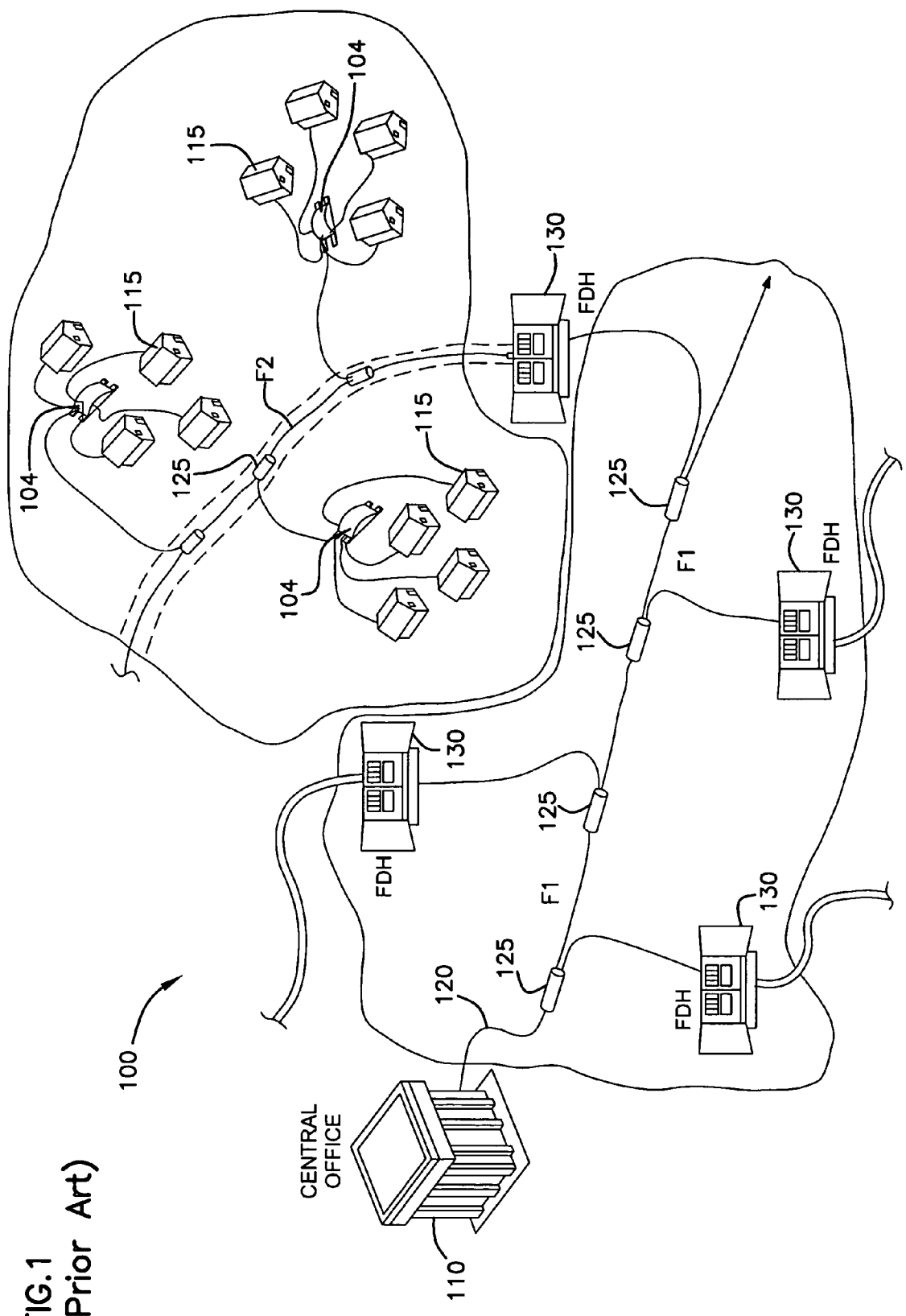
FIG. 1 shows a prior art passive fiber optic network.
Figure 27:
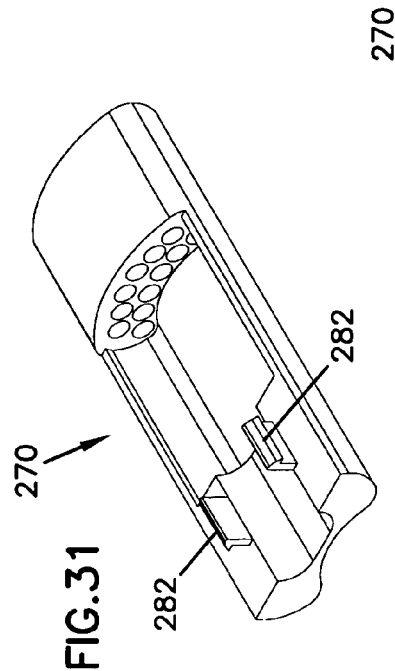
FIG. 27 is a perspective view of a fan-out block used with the system of FIG. 2.
Figure 28:
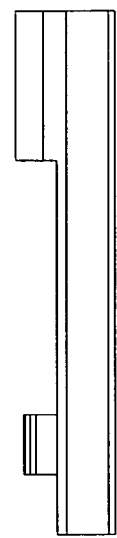
FIG. 28 is a side view of the fan-out block of FIG. 27.
Figure 29:
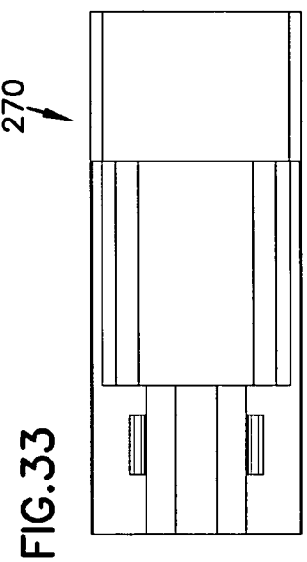
FIG. 29 is a top view of the fan-out block of FIG. 27
Figure 30:
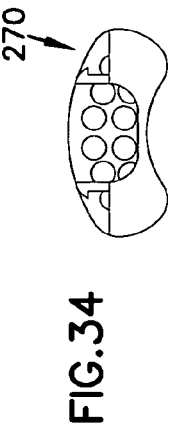
FIG. 30 is an end view of the fan-out block of FIG. 27.
Figure 31:
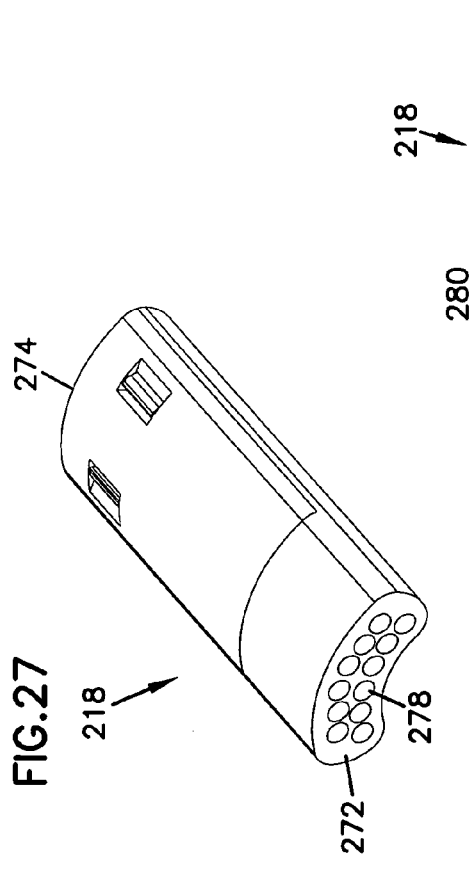
FIGS. 31-34 show various views of the base portion of the fan-out block of FIG. 27.
Figure 32:
Figure 33:
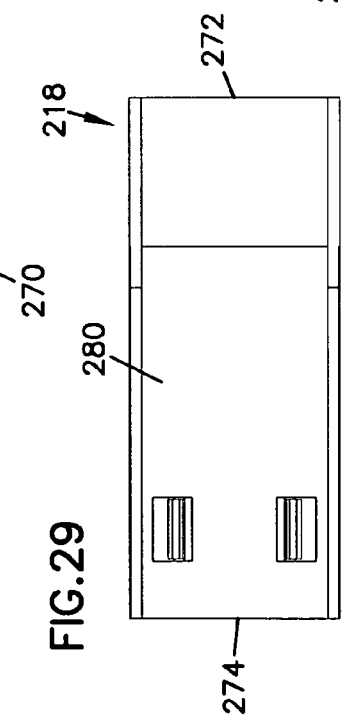
Figure 34:
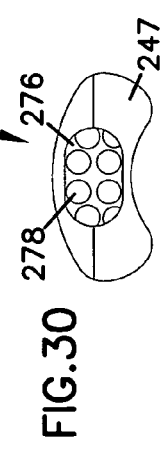

FIGS. 2-6 illustrate a pre-terminated fiber optic cable system 200 having features that are examples of inventive aspects in accordance with the principles of the present disclosure. The cable system 200 includes a main cable 202 (e.g., a distribution cable) and a branch cable 204 that separates from the main cable 202 at a breakout location 206. The breakout location 206 is protected and sealed by a structure such as an enclosure 208. The branch cable 204 includes a plurality of pigtails P1-P12 each having a separate connector 211. The pigtails P1-P12 are packaged in a transport sheath 210 secured to the main cable 202 by retention clips 212, 214. The transport sheath 210 provides mechanical and environmental protection to the pigtails P1-P12 during routing/installation of the cable system 200.

Referring to FIG. 6, the main cable 202 may include a protective sheath 290 containing a plurality of optical fibers 291. A typical main cable may include 48 to 432 individual fibers 291. The fibers 291 are typically positioned within a plurality of buffer tubes 293 located within the sheath 290. The buffer tubes 293 assist in organizing, separating and protecting the fibers 291. The main cable 202 may also include one or more strength members 295 for mechanically reinforcing the cable 202.

The branch cable 204 includes a reinforced cable portion 213 and a pigtail portion (i.e., pigtails P1-P12). The branch cable 204 includes a plurality of optical fibers 215 (e.g., 4-12 fibers) that are spliced to fibers that have been broken-out from the main cable 202 at the breakout location 206. The reinforced cable portion 213 of the branch cable 204 preferably has a reinforced construction for protecting the optical fibers 215. For example, at the reinforced cable portion 213, the fibers 215 can extend through a buffer tube 217 that is reinforced by a pair of strength members 219 and is over coated by a protective outer jacket 221 (see FIG. 6).

The reinforced cable portion 213 of the branch cable 204 extends a length L (e.g., typically 1 foot to 15 feet) from the breakout enclosure 208 to a fan-out block 218 mounted within a first end of the transport sheath 210. At the fan-out block 218, the fibers 215 of the branch cable 204 are fanned out into the separate connectorized pigtails P1-P12 packaged within the transport sheath 210. At the fan-out block 218, the fibers 215 are also upjacketed to provide more strength/protection to the pigtails. For example, the fibers 215 can each be upjacketed to meet cable media Type I standards suitable for use as jumpers. In one embodiment, every pigtail fiber is positioned within a separate 900 micron buffer tube surrounded by a Kevlar layer that is covered by a 2 millimeter outer jacket.

In certain embodiments, the connectors 211 of the pigtails P1-P12 are single fiber connectors with each connector terminated to a separate fiber of the branch cable 204. In one embodiment, the connectors are SC-type connectors. It will be appreciated that LC, MU or other types of fiber optic connectors could also be used.

In the depicted embodiment, to reduce the profile of the connectors 211 during cable routing, the connectorized pigtails P1-P12 loaded into the transport sheath 210 can include single fiber optic connectors that include only the inner bodies of the connectors. For an SC-type fiber optic connector, the inner body of the connector is the portion of the connector that houses the ferrule, and the outer body is the portion of the connector that fits over the inner body and is slid rearwardly relative to the inner body to release the connector from engagement with an adapter. Since the inner bodies are smaller in girth than the outer bodies, this allows the overall package size/girth of the transport sheath to be reduced. The outer bodies of the connectors can be assembled over the inner bodies after the cable has been installed. In other embodiments, connectors with outer bodies can be packaged within the sheath 210.

Referring to FIG. 3, selected pigtails P1-P12 within the transport sheath 210 can be manufactured with different lengths so that some of the connectors 211 of the pigtails are staggered or spaced from one another along the length of the transport sheath 210. In the depicted embodiment, the transport sheath 210 is configured to accommodate mounting connectors 211 in a side-by-side relationship. Thus, pairs of connectors are positioned at spaced-apart locations along the length of the sheath 210. The pigtail lengths can also be selected to correspond with the dimensions and fiber management scheme of a corresponding drop terminal (e.g., see FIG. 40) to which the pigtails are intended to be terminated The transport sheath 210 is adapted to provide both mechanical and environmental protection to the pigtails P1-P12. Example types of protection provided by the transport sheath 210 include ultraviolet protection, crush resistance, chemical resistance, and resistance to moisture intrusion. In one embodiment, the transport sheath 210 can be made of a polymeric material such as polyethylene. Preferably, the transport sheath 210 is sufficiently flexible to allow the sheath to be readily wrapped around a fiber optic cable storage spool in concert with the main cable 202. As described below, end caps can be used to enclose/seal the ends of the transport sheath 210.

Referring to FIGS. 7-10, the transport sheath 210 is elongated along a length that extends between a first end 220 and a second end 222. By way of example, the length of the transport sheath 210 can range from about 14 inches to about 26 inches. Of course, other lengths could also be used. The transport sheath 210 also includes a low profile shape adapted for optimizing the interior space available for receiving connectorized pigtails. For example, referring to FIG. 10, the transport sheath 210 has a transverse cross section that is generally kidney-shaped and includes an outer curved wall portion 224 and an inner curved wall portion 226. The outer curved wall portion 224 has an outer surface that is convex. The inner curved wall portion 226 has an outer surface that is concave and shaped to generally conform or complement the shape of the outer diameter of the main cable 202 (see FIG. 6). The transport sheath 210 also has a width W that is greater than a profile height H. The profile height H represents the distance the sheath 210 projects outwardly from the main cable 202 when the sheath 210 is mounted to the main cable 202. The width W is measured generally perpendicular to the profile height H. Preferably, the width W is sufficiently large to allow the transport sheath 210 to accommodate the inner bodies of two SC-style connectors mounted in a side-by-side relationship within the transport sheath 210.

FIGS. 11-14 illustrate an end piece 230 for closing the second end 222 of the transport sheath 210. The end piece 230 includes a main body 232 having a kidney-shaped transverse cross section sized to fit within the interior of the transport sheath 210. A flange 234 is located at one end of the main body 232. When the end piece 230 is used to close the first end 220 of the transport sheath 210, the flange 234 abuts against the first end 220 of the transport sheath 210. A central opening 236 extends axially through the end piece 230. The central opening 236 is sized to accommodate the reinforced cable portion of branch cable 204 to allow the branch cable 204 to enter the transport sheath 210.

The end piece 230 is preferably frictionally retained within the first end 220 of the transport sheath 210. Structures such as ribs, dimples or knurling may be used on either the sheath or the end piece to enhance friction. More over, a snap fit connection can also be provided between the end piece 230 and the transport sheath 210. Other affixing techniques such as adhesive tape could also be used. An example material suitable for manufacturing the end piece includes silicone.

FIGS. 15-18 depict an end piece 240 adapted for closing the second end 222 of the transport sheath 210. The end piece 240 includes a main body 242 having a kidney-shaped cross section adapted to fit within the second end 222 of the transport sheath 210. The end piece 240 also includes a flange 244 adapted to abut against the second end 222 of the transport sheath 210. The flange 240 does not have any openings for allowing fibers to pass through. Similar to the end piece 230, the end piece 240 can be frictionally retained within the transport sheath 210 and can be manufactured of silicone or other materials.

FIGS. 19-22 depict one type of clip 212 used to secure the transport sheath 210 to the main cable 202. The clip 212 includes a sheath-receiving element 250 having an inner channel defining a cross-sectional shape that complements the outer shape of the transport sheath 210. The sheath-receiving element 250 is open ended to allow the sheath 210 to pass completely through. When the transport sheath 210 is inserted through the sheath-receiving element 250, the sheath-receiving element 250 preferably frictionally engages the outer surface of the transport sheath 210 to limit unintentional axial movement of the transport sheath 210 relative to the clip 212.

The clip 212 also includes a gripping element 252 integrally formed with the sheath-receiving element 250. The gripping element 252 has a generally cylindrical shape with two opposing gripping fingers 254. The clip 212 is preferably made of a flexible material such that the gripping fingers 254 can be flexed apart to allow the gripping element 252 to be inserted over the exterior of the main cable 202. After the gripping element 252 has been inserted over the main cable 202, the gripping fingers 254 are released causing them to resiliently flex to a gripping position in which the fingers engage the outer surface of the main cable 202. Inwardly projecting retention teeth 256 can be provided on the inside of the gripping element 252 to increase the holding force provided by the gripping element 252. To increase the clamping force, tape, cable ties or other types of strapping structures can also be used to compress the gripping fingers 254 more tightly against the cable.

FIGS. 23-26 show the other clip 214 that is mounted over the second end 222 of the transport sheath 210. Similar to clips 212, the clip 214 includes a gripping element 252 for gripping the main cable 202, and an integral sheath-receiving element 250 defining a channel for receiving the transport sheath 210. However, in contrast to the clip 212, the clip 214 includes a rounded front guide nose 258 that encloses the front end of the sheath-receiving element. During installation of the cable system 200, the rounded nose 250 assists in preventing the transport sheath 210 from engaging or catching obstructions when the cable is fed through an underground conduit or through aerial rings.

FIGS. 27-30 depict the fan-out block 218 of the cable system 200. The fan-out block 218 is sized and shaped to be axially inserted within the transport sheath 210. Therefore, the fan-out block 218 is depicted as having an outer transverse cross sectional shape that is generally kidney shaped so as to match to the shape of the inner passage of the transport sheath 210. The fan-out block 218 includes a main body 270 having a second end 272 and a first end 274. A laterally elongated opening 276 is provided at the first end 274 for receiving the reinforced cable portion of the branch cable 204. A plurality of fanning openings 278 are provided at the second end 272 for receiving and fanning out the individually jacketed pigtail fibers of the branch cable 204. A removable cover 280 is provided for accessing the interior of the fan-out block 218. As shown at FIGS. 31-34, the main body 270 includes resilient locking fingers 282 that provide a snap fit connection with the cover 280 to retain the cover on the main body 270. As shown at FIGS. 35-38, the cover 280 includes openings 284 for receiving the locking fingers 282. The cover 280 and the main body 270 cooperate to define opposite sides of the opening 276.

The cable system 200 of FIG. 2 can be manufactured using a plurality of design parameters. One design parameter includes the number of fibers to be provided in the main cable 202. Another parameter includes the number of breakout locations 206, and the number of branch fibers provided at each breakout location 206. The breakout locations may be identified based on the particular location at which the cable system is to be installed. For example, breakout locations may be positioned on the main cable 202 to correspond with the geographic locations of utility poles or ground mounted pedestals in a neighborhood in which the cable system is to be installed.

In certain embodiments, branch cable 204 can be manufactured as a packaged branch assembly 400 (see FIG. 39) separate from the main cable 202. The assembly 400 is manufactured by providing the branch cable 204 with the reinforced cable portion 213, and using the fan-out block 218 to fan out the pigtail fibers from the end of the reinforced cable portion 213. The pigtail fibers are then individually connectorized. After the pigtail fibers have been connectorized, the connectorized pigtails and the fan-out block 218 are loaded into the transport sheath 210, and the ends of the sheath are sealed by the end pieces 230, 240. Once the transport sheath 210 is loaded and sealed, sheath 210 can be inserted through the sheath-receiving elements 250 of the clips 212, 214, and the assembly is complete.

To manufacture the final cable system 200, a supply of branch assemblies 400 are provided at a cable manufacturing plant where the main cables 202 are processed. At the factory, the branch assemblies 400 can be spliced to fibers of the main cable that have been extracted at each breakout location 206. Once each splice is complete, the clips 212, 214 of the corresponding assembly 400 are then snapped over the main cable 202 to secure the transport sheath 210 to the main cable 202. In this secured position, the main cable 202 and the transport sheath 210 are generally parallel to one another. Similarly, the main cable 202 and the branch cable 204 are generally parallel to one another. Also, the inner side of the transport sheath 210 mates with the outer surface of the main cable 202. Once the transport sheath has been secured to the main cable 202, the cable system 200 can be spooled and transported to an installation location.

At the installation location, the cable system 200 is removed from the spool and routed along an installation pathway. Example installation pathways include underground pathways traveling through underground conduits/pipes (e.g., pipes having a 1.25 inch inner diameter) or aerial pathways traveling through rings mounted on utility poles. During transport of the cable system 200 along the pathway, the compact and secure packaging provided by the transport sheath 210 and the retention clips 212, 214 protects the pigtails and prevents the breakout cable 204 from interfering with the installation process.

Figure 40:
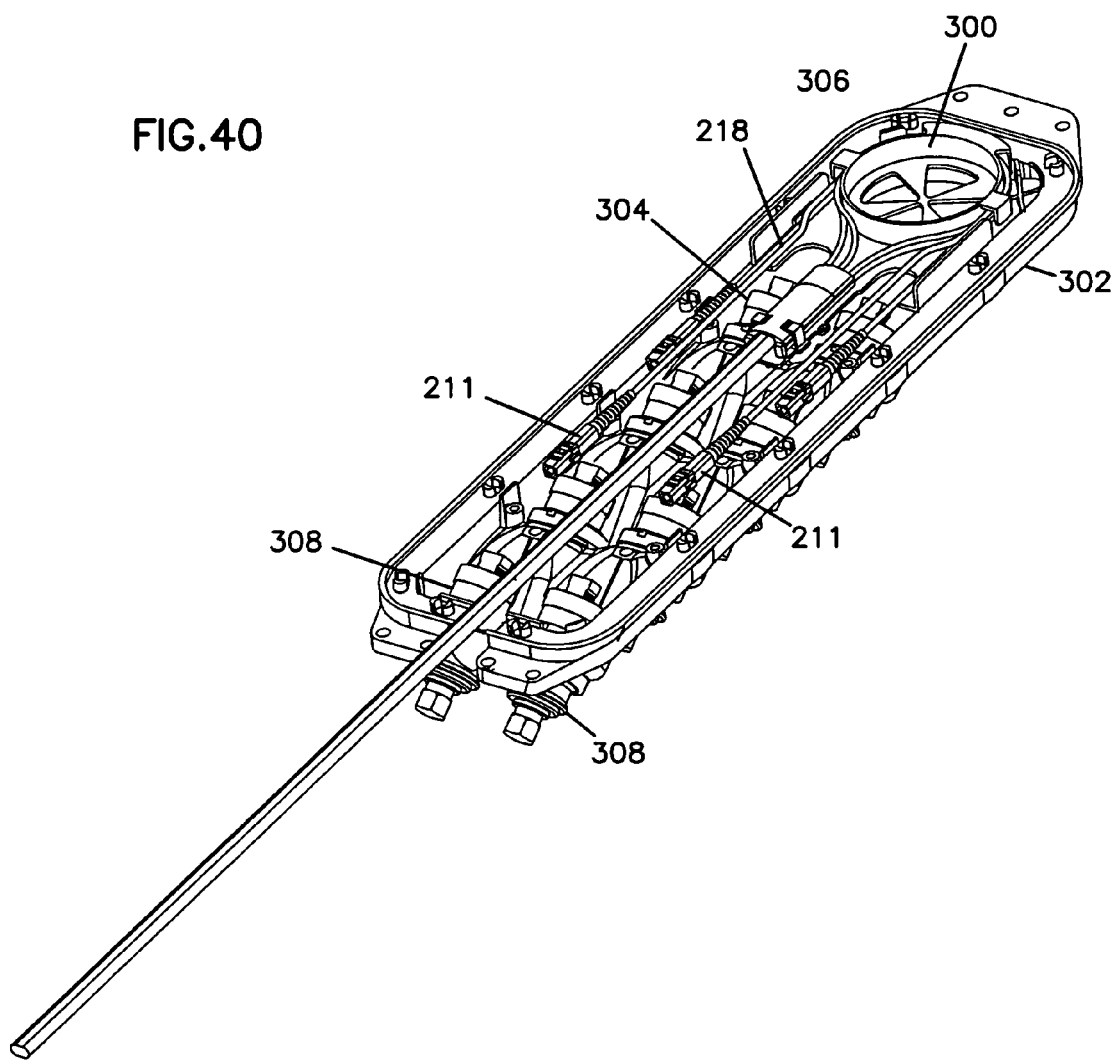
FIG. 40 shows the breakout cable assembly of FIG. 39 used in combination with a drop terminal.
Figure 46:
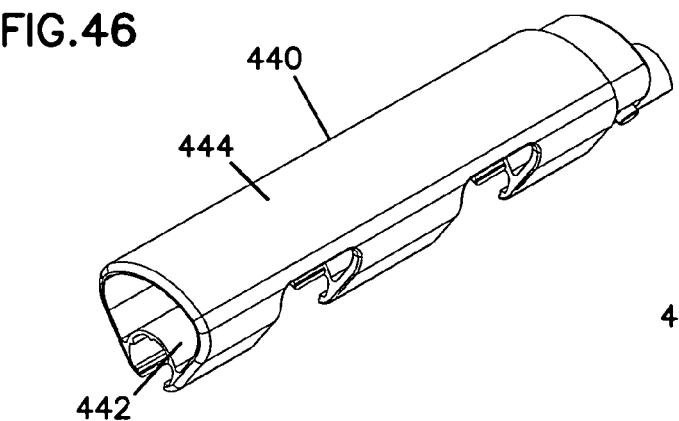
FIG. 46 is a perspective view of an example retaining closure of the breakout assembly of FIG. 41.

In some embodiments, the cable system 200 is laid out so that the pre-manufactured breakout locations 206 align with the actual geographic breakout locations of the given installation plan. In other embodiments, the pre-manufactured breakout locations 206 are offset on one side of the geographic breakout locations and the transport sheaths 210 are offset on the opposite side. In still other embodiments, the pre-manufactured breakout locations 206 can be aligned with the geographic breakout locations. Once the cable system 200 is laid out, the branch cables 204 can be accessed by grasping the branch cable 204 at the breakout location 206 and pulling the branch cable 204. As the branch cable 204 is pulled, the transport sheath 210, which is offset a distance L from the pre-manufactured breakout location, will be pulled from within the sheath-receiving elements 250 of the clips 212, 214. The installer will continue to pull the branch cable 204 until the transport sheath 210 is exposed. Once the transport sheath 210 is exposed, the transport sheath 210 is removed from the branch cable 204 and the connectorized pigtails are mounted on a cable management tray 300 that fits within a drop terminal 302 (see FIG. 40). The cable management tray 300 can include a clamping structure 304 for holding the fan-out block 218, and a spool 306 for facilitating routing the pigtails while maintaining minimum bending radius requirements. After the pigtails have been mounted on the cable management tray 300, the cable management tray 300 is mounted within the terminal 302 as shown at FIG. 40. The connectors 211 of the pigtails are then connected to adapters 308 provided on the terminal 302. The adapters 308 have inner sockets for receiving the connectors 211 of the pigtails and outer sockets for receiving connectors terminated to lines each routed to a subscriber's premises.

Referring now to FIGS. 41-58, another embodiment of a fiber optic cable system 400 having features that are examples of inventive aspects in accordance with the principles of the present disclosure is shown. The cable system 400 includes the main cable 202, the branch cable 204, the transport sheath 210, and the retention clips 212 as described above. The cable system 400 also includes a first end piece 430 configured to enclose the first end 220 of the transport sheath 210, a retaining closure 440 configured to enclose the second end 222 of the transport sheath 210, an end cover 450 configured to mount over a portion of the retaining closure 440, and a clamp 460 configured to secure the retaining closure 440 to the main cable 202.

FIGS. 42-45 illustrate one embodiment of a first end piece 430. A channel 435 extends through the end piece 430 from a first end 431 to a second end 433. In general, the channel 435 is sized and shaped to accommodate the reinforced section 213 of the branch cable 204. The end piece 430 secures the branch cable 204 within the transport sheath 210.

End piece 430 includes a plug section 432 and a protruding section 434. The plug section 432 extends from the first end 431 of the end piece 430 to a shoulder 439. In general, the plug section 432 is configured to fit within the first end 220 of the transport sheath 210. In the example shown, the plug section 432 has a kidney-shaped transverse cross section. For example, as shown in FIG. 43, the plug section 432 has a convex surface 437, a concave surface 436, and side surfaces 438 extending between the concave surface 436 and the convex surface 437. In some embodiments, the plug section 432 is friction fit within the transport sheath 210. In other embodiments, the plug section 432 is secured to the transport sheath 210 with adhesive. Of course, any suitable fasteners can be used to secure the plug section 432 to the transport sheath 210 as desired.

The protruding section 434 tapers inwardly from the shoulder 439 to a second end 433 of the end piece 430. In some embodiments, the protruding section 434 is configured to accommodate the main cable 202. In some embodiments, the outer perimeter of the protruding section 434 is larger than the outer perimeter of the plug section 432. In such embodiments, the shoulder 439 extends from the outer perimeter of the plug section 432 to the outer perimeter of the protruding section 434. When the end piece 430 is installed, the shoulder 439 abuts against one end of the transport sheath 210.

The reinforced section 213 of the branch cable 204 proceeds through the end piece 430 to the fan-out block 218 described above. The fan-out box 218 separates the reinforced section 213 into the multiple pigtails P1-P12, which are then routed through the remainder of the transport sheath 210.

FIGS. 46-50 illustrate one embodiment of the retaining closure 440. The retaining closure 440 includes a securement section 442 and a retaining section 444. The securement section 442 couples the retaining closure 440 to the main cable 202. In some embodiments, the securement section 442 includes resilient sections 441 (e.g., legs) forming a substantially cylindrical channel. In one example embodiment, the resilient sections 441 have protrusions 443 (best seen in FIG. 48) to grip the main cable 202.

Figure 47:
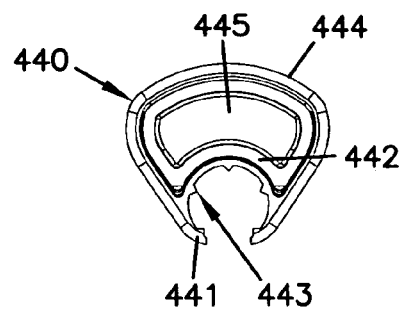
FIG. 47 is a cross-sectional view of the retaining closure of FIG. 46.
Figure 48:
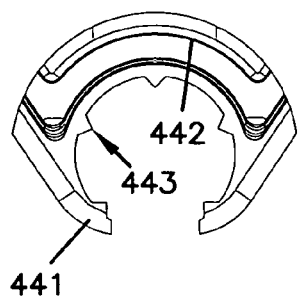
FIG. 48 is an enlarged cross-sectional view of the retaining closure of FIG. 46.
Figure 49:
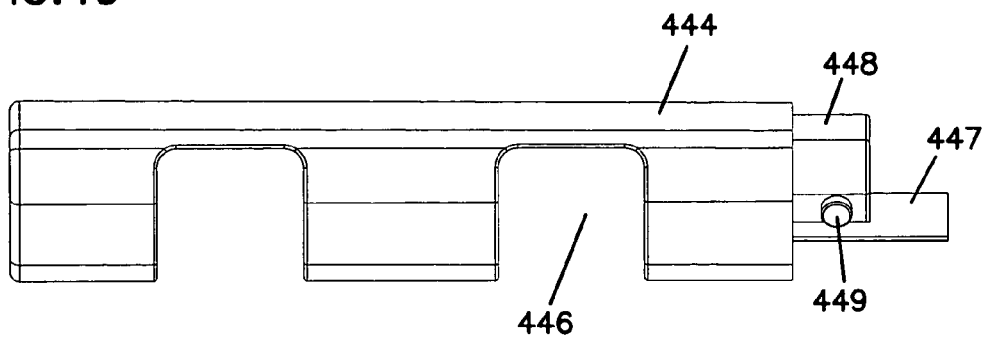
FIG. 49 is a side view of the retaining closure of FIG. 46.
Figure 50:
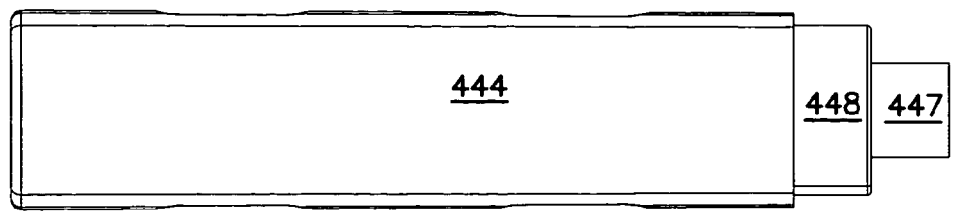
FIG. 50 is a top view of the retaining closure of FIG. 46.
Figure 51:
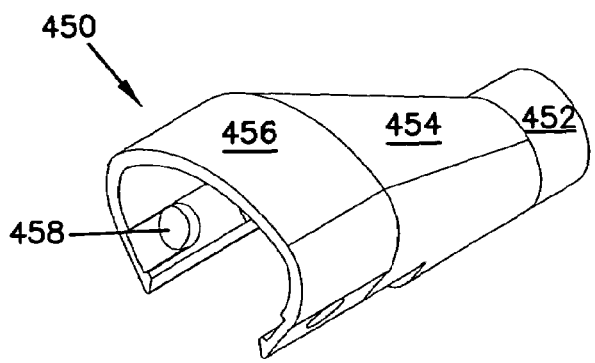
FIG. 51 is a perspective view of an example second end piece of the breakout assembly of FIG. 41.
Figure 52:
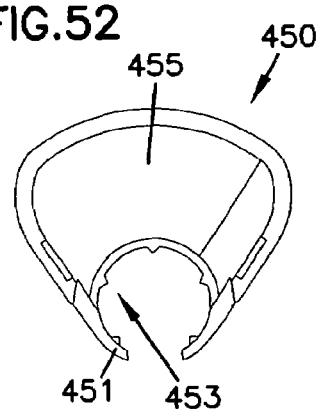
FIG. 52 is a cross-sectional view of the second end piece of FIG. 51.
Figure 53:
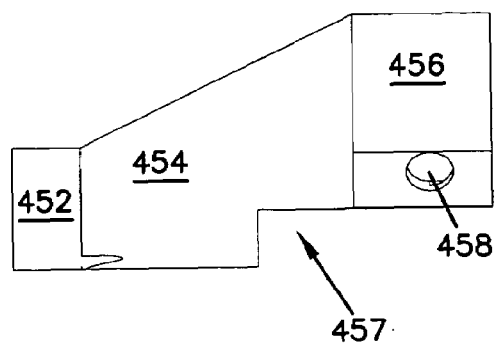
FIG. 53 is a side view of the second end piece of FIG. 51.

The retaining section 444 is coupled to the securement section 442 and forms a channel 445 through which the transport sheath 210 can be routed. In general, the channel 445 is shaped to accommodate the transport sheath 210. In one example embodiment, the channel 445 has a generally kidney-shaped transverse cross-section (FIG. 47). In some embodiments, the retaining section 444 includes drainage holes 446 (see FIGS. 46 and 49).

The retaining closure 440 also includes a sheath stopper 448 against which one end of the transport sheath 210 abuts when positioned within the retaining closure 440. In the example shown, the sheath stopper 448 protrudes outwardly from the retaining section 444. In other embodiments, however, the sheath stopper 448 is coterminous with the retaining section 444.

In some embodiments, the retaining closure 440 includes a flange 447 protruding from the securement section 444. The flange 447 protrudes sufficient to accommodate a clamp 460 (FIGS. 57-58), such as a strap clamp, or other fastening member. The clamp 460 can be used to secure the flange 447 to the main cable 202. In one embodiment, the flange 447 is curved to accommodate the main cable 202.

Referring now to FIGS. 51-55, the end cover 450 includes a securement section 452, a retaining section 456, and a connecting section 454 extending from the retaining section 456 to the securement section 452. The securement section 452 is configured to couple to the main cable 202. In some embodiments, the securement section 452 includes resilient sections 451 (e.g., legs) for gripping the main cable 202.

In one example embodiment, the securement section 452 includes protrusions, ribs, or other surface structures 453 to increase friction between the end cover 450 and the main cable 202.

The retaining section 456 is shaped and sized to abut the retaining section 444 of the retaining closure 440. In general, the retaining section 456 of the second end piece 450 is configured to fit around the sheath stopper 448 of the retaining closure 440. In some embodiments, the retaining section 456 includes cutouts 457 designed to accommodate the clamp 460 or other fastener securing the retaining closure 440 to the main cable 202.

Figure 54:
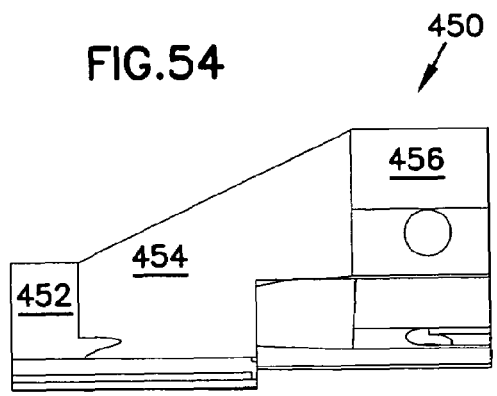
FIG. 54 is a rotated view of the second end piece of FIG. 53.
Figure 55:
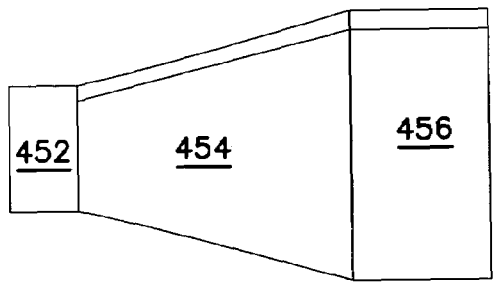
FIG. 55 is a top view of the second end piece of FIG. 51.

In some embodiments, the connecting section 454 tapers inwardly from the retaining section 456 to the securement section 452. In one embodiment, the connecting section 454 extends from the retaining section 456 to the end of the securement section 452. In another embodiment, the connecting section 454 extends from the retaining section 456 to an intermediate portion of the securement section 452 as shown in FIG. 54.

The end cover 450 can be configured to secure to the retaining closure 440. In some embodiments, to secure the end cover 450 as shown in FIGS. 41 and 58, the end cover 450 is snapped onto the retaining closure 440. In one such embodiment, the retaining closure 440 includes a protrusion 449 and the end cover 450 includes a hole 458 for receiving the protrusion 449 such that a snap-fit connection is provided between the cover 450 and the closure 440. In one embodiment, the end cover 450 is configured to flex sufficient to receive the protrusion 449 in the hold 458. In other embodiments, however, other fasteners can be used to secure the end cover 450 to the retaining closure 440.

Referring now to FIGS. 56-58, during the manufacturing phase, the transport sheath 210 is secured to the main cable 202 in the factory by inserting one end of the transport sheath 210 through retention clips 212 as shown in FIG. 56. The downstream end of the transport sheath 210 is then inserted into the retaining closure 440 until the downstream end abuts against the sheath stopper 448. A clamp 460 is placed over flange 447 of the retaining closure 440 to secure the retaining closure 440 in position on the main cable 202. The cover 450 is slid over the flange 447 and sheath stopper 448 of the retaining closure 440 until the protrusion 449 on the retaining closure 440 snaps into the hole 458 on the cover 450 (FIG. 58).

During installation of the cable system 400, the tapered ends of the end piece 430 and the end cover 450 assist in inhibiting the transport sheath 210 from engaging or catching obstructions when the cable is fed through an underground conduit or through aerial rings. Because the sheath 210 is tapered at both ends, the cable can be fed (e.g., pulled) in either direction along its longitudinal axis. In a preferred embodiment, the cable is pulled so that the transport sheaths 210 trail the breakout locations 125.

As previously described, certain embodiments of the present disclosure will include pigtails having connectors including inner bodies not equipped with outer bodies. For such embodiments, the outer bodies of the connectors may be snapped within the adapters inside the drop terminal prior to connecting the inner bodies to the adapters. In this way, the inner bodies are connected to the adapters by inserting the inner bodies into the outer bodies, which were pre-inserted into the adapters. In this way, the connectors are assembled in the same step used to connect the connectors to the adapters.

It will be appreciated that the various aspects of the present disclosure provide numerous advantages. For example, the packaging arrangement disclosed herein is relatively small in size thereby making it ideally suited for both aerial and underground applications. Also, the sleek design of the transport sheath and the retention clips reduces the likelihood of catching snags during the installation process. Further, the protection provided by the transport sheath allows installers to defer the cost of immediately providing drop terminals. Instead, after installation, the pigtails can be left unused, protected within the sheath, for an extended period of time, until the branch cable is needed for service. Furthermore, the disclosed arrangement does not require any intermediate connectors between the single fiber end connectors and the breakout location. By minimizing the number of connectors utilized, cost can be reduced.

From the forgoing detailed description, it will be evident that modifications and variations can be made in the devices of the disclosure without departing from the spirit or scope of the invention.

What is claimed is:

1. A fiber optic cable breakout arrangement comprising:
a main cable;
a branch cable that separates from the main cable, the branch cable including a plurality of pigtails including optical fibers individually connected to separate fiber optic connectors that do not include outer bodies;
an elongate protective sheath in which the fiber optic connectors of the pigtails are packaged, the sheath being secured to the exterior of the main cable, the sheath having a profile height that extends generally radially outwardly from the main cable between a first convex side and a second concave side, the sheath also having a width, wherein the width is generally transverse relative to the profile height, and wherein the profile height is less than the width.

2. The breakout arrangement of claim 1, wherein the sheath has sealed ends.

3. The breakout arrangement of claim 1, wherein a fan-out structure is packaged within the sheath, the fan-out structure having a cross-section generally matching a cross-section of the sheath.

4. The breakout arrangement of claim 1, wherein the sheath has a kidney-shaped cross-section.

5. The breakout arrangement of claim 1, further comprising clips for securing the sheath to the main cable.

6. The breakout arrangement of claim 1, wherein the fiber optic connectors include SC connectors.

7. The breakout arrangement of claim 1, wherein pairs of the fiber optic connectors are positioned side-by-side within the sheath.

8. The breakout arrangement of claim 1, wherein the fiber optic connectors are spaced apart along a length of the sheath.

9. The breakout arrangement of claim 1, wherein the sheath has an inner curvature that complements an outer diameter of the main cable.

10. The breakout arrangement of claim 1, further comprising first and second end pieces configured to seal opposing ends of the sheath, each end piece being tapered.

11. The breakout arrangement of claim 10, wherein the first end piece includes a plug section and a tapered section.

12. The breakout arrangement of claim 10, wherein the second end piece includes a retaining closure configured to attach to the exterior of the main cable and to secure the sheath to the main cable.

13. The breakout arrangement of claim 12, further comprising a clamp configured to secure the retaining closure to a position on the main cable.

14. The breakout arrangement of claim 12, wherein the second end piece further includes a cover configured to attach to the retaining closure.

15. A fiber optic cable breakout arrangement comprising:
a main cable;
a branch cable that separates from the main cable at a breakout location, the branch cable including a plurality of pigtails including optical fibers individually connected to separate fiber optic connectors;
an elongate protective sheath in which the fiber optic connectors of the pigtails are packaged, the sheath being secured to the exterior of the main cable at a location spaced from the breakout location; and
a plurality of clips attached to positions spaced along the main cable, each clip being configured to secure the sheath to the main cable when the sheath is inserted through the clip, and each clip being configured to remain at the respective position on the main cable when the sheath is pulled from the breakout location, wherein the clips include a retaining closure configured to secure the sheath to the main cable, the retaining closure including a sheath stopper against which one end of the sheath abuts when positioned within the retaining closure.

16. The breakout arrangement of claim 15, wherein the retaining closure is configured to be held in position to the main cable by a clamp.

17. The breakout arrangement of claim 15, wherein the sheath has a convex outer surface and a concave inner surface.

18. A method of installing a fiber optic cable breakout arrangement, the method comprising:
attaching a first end of a branch cable to a main cable at a breakout location, the branch cable including a plurality of pigtails including optical fibers, each optical fiber connected to a fiber optic connector arranged at a second end of the branch cable;
positioning a breakout enclosure around a portion of the main cable and a portion of the branch cable at the breakout location, wherein the second end of the branch cable extends outwardly from the breakout enclosure;
packaging the fiber optic connectors within an elongate protective sheath having a width that is greater than a profile height of the elongate protective sheath, the profile height extending generally radially outwardly from the main cable, the width of the elongate protective sheath being generally transverse to the profile height;
securing the elongate protective sheath to the main cable at a location spaced from the breakout enclosure;
deploying the main cable at an installation site; and
removing the sheath from the fiber optic connectors after deployment.

19. The method of claim 18, further comprising:
accessing the plurality of pigtails within the elongate sheath; and
assembling outer bodies of the fiber optic connectors over "inner bodies of the fiber optic connectors".

20. The method of claim 18, further comprising:
pulling the branch cable adjacent the breakout location to uncouple the elongate sheath from at least one clip; and
accessing the elongate sheath, wherein the enclosure remains intact.

21. A method of installing a fiber optic cable breakout arrangement, the method comprising:
attaching a first end of a branch cable to a main cable at a breakout location, the branch cable including a plurality of pigtails including optical fibers, each optical fiber terminated at an interior body of a fiber optic connector at a second end of the branch cable; and
packaging the interior bodies of the fiber optic connectors terminating the optical fibers within an elongate protective sheath coupled to the main cable, wherein packaging the interior bodies includes packaging the fiber optic connectors without outer bodies.

22. A fiber optic cable breakout arrangement comprising:
a main cable;
a branch cable that separates from the main cable, the branch cable including a plurality of pigtails including optical fibers individually connected to separate fiber optic connectors; and
an elongate protective sheath in which the fiber optic connectors of the pigtails are packaged, the sheath is secured to the exterior of the main cable, the sheath has a convex outer surface and a concave inner surface, the sheath has a width and a profile height, the profile height extends generally radially outwardly from the main cable and the width is generally transverse relative to the profile height, the profile height is less than the width;

wherein the fiber optic connectors include SC connectors; and wherein the SC connectors do not include outer bodies.

23. A fiber optic cable breakout arrangement comprising:
- a main cable;
- a branch cable that separates from the main cable, the branch cable including a plurality of pigtails including optical fibers individually connected to separate fiber optic connectors; and
- an elongate protective sheath in which the fiber optic connectors of the pigtails are packaged, the sheath is secured to the exterior of the main cable, the sheath has a convex outer surface and a concave inner surface, the sheath has a width and a profile height, the profile height extends generally radially outwardly from the main cable and the width is generally transverse relative to the profile height, the profile height is less than the width; and
- first and second end pieces configured to seal opposing ends of the sheath, each end piece being tapered, wherein the second end piece includes a retaining closure configured to attach to the exterior of the main cable and to secure the sheath to the main cable.

24. The breakout arrangement of claim 23, further comprising a clamp configured to secure the retaining closure to a position on the main cable.

25. The breakout arrangement of claim 23, wherein the second end piece further includes a cover configured to attach to the retaining closure.

26. A fiber optic cable breakout arrangement comprising:
- a main cable;
- a branch cable that separates from the main cable at a breakout location, the branch cable including a plurality of pigtails including optical fibers individually connected to separate fiber optic connectors;
- an elongate protective sheath in which the fiber optic connectors of the pigtails are packaged, the sheath is secured to the exterior of the main cable; and
- at least one clip attached to a position on the main cable, each clip is configured to secure the sheath to the main cable when the sheath is inserted through the clip, and each clip is configured to remain at the position on the main cable when the sheath is pulled from the breakout location;
- wherein the at least one clip includes a retaining closure configured to be held in position to the main cable by a clamp.

27. A method of installing a fiber optic cable breakout arrangement, the method comprising:
- attaching a branch cable to a main cable at a breakout location, the branch cable including a plurality of pigtails including optical fibers, each optical fiber connected to an interior body of a fiber optic connector;
- packaging the plurality of pigtails and the interior bodies within an elongate protective sheath;
- inserting the elongate sheath through at least one clip, the at least one clip attached to the main cable and configured to secure the elongate sheath to the main cable;
- pulling the branch cable at the breakout location to access the elongate sheath;
- accessing the plurality of pigtails within the elongate sheath; and
- assembling outer bodies of the fiber optic connectors over the inner bodies.

* * * * *

UNITED STATES PATENT AND TRADEMARK OFFICE
CERTIFICATE OF CORRECTION

| | | |
|---|---|---|
| PATENT NO. | : 7,418,177 B2 | Page 1 of 1 |
| APPLICATION NO. | : 11/490644 | |
| DATED | : August 26, 2008 | |
| INVENTOR(S) | : Lu et al. | |

It is certified that error appears in the above-identified patent and that said Letters Patent is hereby corrected as shown below:

Col. 12, lines 35-36, claim 19: "over "inner bodies of the fiber optic connectors"." should read --over inner bodies of the fiber optic connectors.--

Signed and Sealed this
Nineteenth Day of February, 2013

Teresa Stanek Rea
*Acting Director of the United States Patent and Trademark Office*